(12) United States Patent  (10) Patent No.: US 9,189,044 B2
Liang  (45) Date of Patent: Nov. 17, 2015

(54) MOTION SENSING APPARATUS AND MOBILE TERMINAL

(75) Inventor: Chunkang Liang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 519 days.

(21) Appl. No.: 13/580,666

(22) PCT Filed: Dec. 28, 2010

(86) PCT No.: PCT/CN2010/080367
§ 371 (c)(1),
(2), (4) Date: Aug. 23, 2012

(87) PCT Pub. No.: WO2012/062012
PCT Pub. Date: May 18, 2012

(65) Prior Publication Data
US 2012/0318061 A1    Dec. 20, 2012

(30) Foreign Application Priority Data

Nov. 8, 2010  (CN) .......................... 2010 1 0534915

(51) Int. Cl.
*H01H 35/02*  (2006.01)
*H01H 35/14*  (2006.01)
(Continued)

(52) U.S. Cl.
CPC ................ *G06F 1/32* (2013.01); *G06F 3/0346* (2013.01); *H01H 35/02* (2013.01); *H01H 35/14* (2013.01)

(58) Field of Classification Search
CPC ..... H01H 35/02; H01H 34/15; H01H 35/027; H01H 35/141; H01H 35/144; H01H 34/14

USPC ........................................ 200/61.45 R–61.53
See application file for complete search history.

(56) References Cited

U.S. PATENT DOCUMENTS 4,196,429 A * 4/1980 Davis ............................ 340/669
7,034,693 B2 * 4/2006 Lee, IV ...................... 340/573.3
8,188,391 B2 * 5/2012 Ma ........................... 200/61.45 R
(Continued)

FOREIGN PATENT DOCUMENTS

CN  101124621 A   2/2008
CN  101593050 A   12/2009
CN  101825945 A   9/2010

OTHER PUBLICATIONS

International Search Report in international application No. PCT/CN2010/080367, mailed on Jun. 30, 2011.
(Continued)

*Primary Examiner* — Renee Luebke
*Assistant Examiner* — Lheiren Mae A Caroc
(74) *Attorney, Agent, or Firm* — Oppedahl Patent Law Firm LLC

(57) ABSTRACT

A motion sensing apparatus provided. The apparatus includes a sensing module and a processing module, wherein the sensing module includes at least two outputs, the processing module includes at least two signal ports, each signal port of the processing module is connected with one of the outputs of the sensing module respectively, and the sensing module outputs sensing signals from different outputs according to sensed different motions, and the processing module performs corresponding processes according to the sensing signals received from different signal ports. The apparatus simplifies a hardware circuit to some extent, saves the cost, and reduces the consumption of electric energy.

14 Claims, 2 Drawing Sheets

(51) Int. Cl.
*G06F 1/32* (2006.01)
*G06F 3/0346* (2013.01)

(56) References Cited

U.S. PATENT DOCUMENTS

| | | | |
|---|---|---|---|
| 2005/0104853 A1 | 5/2005 | Sitalasai et al. | |
| 2005/0161309 A1* | 7/2005 | Weng et al. | 200/61.45 R |
| 2009/0298538 A1 | 12/2009 | Gao et al. | |
| 2010/0225505 A1 | 9/2010 | Yang | |

OTHER PUBLICATIONS

English Translation of the Written Opinion of the International Search Authority in international application No. PCT/CN2010/080367, mailed on Jun. 30, 2011.

* cited by examiner

MOTION SENSING APPARATUS AND MOBILE TERMINAL

TECHNICAL FIELD

The disclosure relates to the field of sensing technology, and particularly to a motion sensing apparatus and a mobile terminal.

BACKGROUND

A corresponding reaction caused by the influence of external motion is referred to as motion sensing. At present, the motion sensing technology is widely used, for example, in TV remote controls, electric vehicles, computers, game consoles and mobile terminals (e.g., mobile phones).

At present, the mobile terminal is no longer a simple communication terminal, in addition to the traditional voice communicating function, functions like music playing, video playing, recording, taking photographs and video, and internet surfing make the mobile terminal fashionable and highly entertaining. Producing a fashionable and entertaining mobile terminal has been a trend in the mobile terminal development. Therefore, how to make the mobile terminal more practical, fashionable and attractive has become a key factor that mobile terminal manufacturers need to consider in the market competition. As the multimedia technology continues to develop, it has become a trend that the motion sensing technology is applied to the mobile terminal.

At present, when mobile terminal users want to change background pictures or play the next song, most of them have to change them manually, which is more rigid to operate without novelty, and fails to stimulate the user's desire to buy mobile terminals. However, the mobile terminal with the screen-shaking function developed by motion sensing technology leads the way for a new market. This mobile terminal has a screen shaking function, when the user needs to change in a certain function, it can be realized by gently shaking the mobile terminal. By replacing traditional manual operation with this method, it is possible to increase the practical and fashionable uses of the mobile terminal.

At present, the main principle of the mobile terminal with screen shaking function is that the function of screen shaking is realized depending on a sensor system consisting of a gravity sensor or an acceleration sensor and a hardware processing circuit. One sensing signal is generated by the sensor system by sensing the shaking operation of a user, the hardware processing circuit in the sensor system performs amplification, filtering and the like processes on the sensing signal, and then outputs a processing signal. The processor in the mobile terminal detects the processing signal output by the sensor system when necessary, and performs corresponding screen shaking processes according to the processing signal. Since the sensor system needs to perform amplification and filtering processes on the sensing signal, it not only makes the hardware circuit of the sensor system more complex, but also increases the production cost of the mobile terminal. At the same time, electric energy stored in the mobile terminal will also be consumed when these hardware processing circuits process the sensing signals, which reduces the endurance capability and the reliability of the mobile terminal to some extent.

SUMMARY

In view of the deficiency in the prior art, the disclosure provides a motion sensing apparatus and a mobile terminal. The apparatus simplifies a hardware circuit to some extent, saves production cost, and reduces the consumption of electric energy. Compared with the conventional mobile terminal, the mobile terminal simplifies the hardware circuit to some extent, reduces the production cost of the mobile terminal, and improves the endurance capability and the reliability of the mobile terminal.

In order to solve the above technical problem, the disclosure adopts the following technical schemes:

A motion sensing apparatus includes a sensing module and a processing module, wherein the sensing module includes at least two outputs, the processing module includes at least two signal ports, each signal port of the processing module is connected with one of the outputs of the sensing module respectively; and the sensing module outputs sensing signals from different outputs according to sensed different motions, and the processing module performs corresponding processes according to the sensing signals received from different signal ports.

In one embodiment of the disclosure, one end of the connector is fixedly connected with the signal source end, while the other end of the connector is correspondingly in contact with one output of the sensing module under different motions sensed by the sensing module.

In one embodiment of the disclosure, the connector includes a rotation axis, the other end of the connector is rotatable around the rotation axis so as to rotatably contact one output of the sensing module under the different motions sensed by the sensing module.

In one embodiment of the disclosure, the connector includes a location unit, a reset unit and a communication unit; the communication unit is connected with the location unit via the reset unit, and the communication unit is shifted from an original position relative to the location unit to be in contact with one output of the sensing module and the signal source end under the different motions sensed by the sensing module, and makes the output in communication with the signal source end, and the reset unit is configured to restore the shifted communication unit to the original position.

In one embodiment of the disclosure, the location unit is a sensing cavity, and the reset unit is a spring.

In one embodiment of the disclosure, the location unit is a sensing cavity including a buffer wall, the connector includes two of the communication units, the two of the communication units are located on both sides of the buffer wall respectively and connected to the buffer wall via the reset unit, and the reset unit is a spring.

In one embodiment of the disclosure, the communication unit is a conductive metal sheet.

The disclosure also provides a mobile terminal, which includes the motion sensing apparatus arranged in the mobile terminal, the apparatus includes a sensing module and a processing module, wherein the sensing module includes at least two outputs, the processing module includes at least two signal ports, each signal port of the processing module is connected with one of the outputs of the sensing module respectively; and the sensing module outputs sensing signals from different outputs according to sensed different motions, and the processing module performs corresponding processes according to the sensing signals received from different signal ports.

As the above technical schemes are adopted, the beneficial effect of using the disclosure is that: the motion sensing apparatus consists of some simple components, thereby simplifying the hardware circuit to some extent, saving the cost, and reducing the consumption of electric energy. At the same time, a mobile terminal with the screen shaking function can be produced by applying the motion sensing apparatus to the mobile terminal. Since the sensing module and the processing module in the motion sensing apparatus replace the sensor system consisting of a gravity sensor, a lateral acceleration sensor and a hardware processing circuit in the prior art, the hardware circuit is simplified to some extent, and the production cost of the mobile terminal is reduced compared with the existing mobile terminals. By sensing the user's different motions with the sensing module, sensing signals are generated, the processing module performs corresponding processes directly according to the sensing signals. Compared with the existing sensor system, electric energy consumed by hardware processing circuit is reduced, thereby also improving the endurance capability and the reliability of the mobile terminal to some extent.

DETAILED DESCRIPTION

Figure 1:
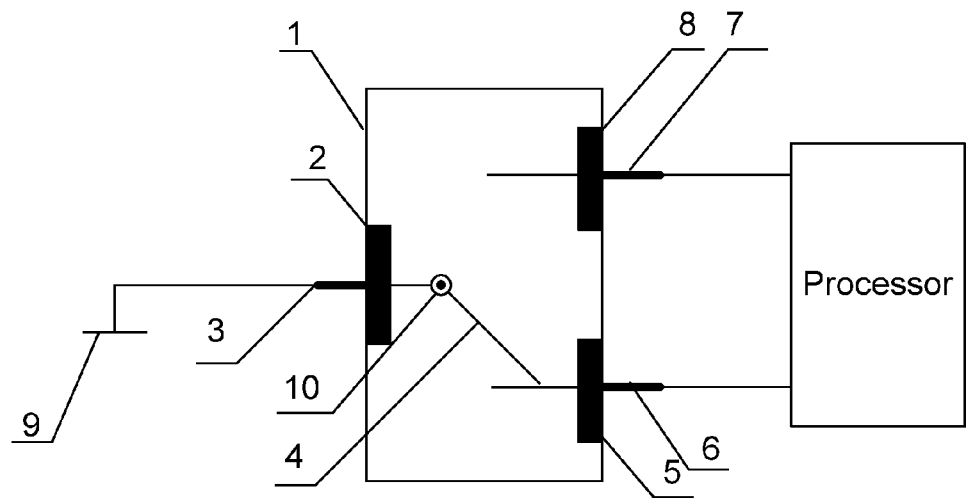
FIG. 1 is a schematic diagram of a first embodiment of a motion sensing apparatus of the disclosure.

The disclosure is described below in detail through specific embodiments in conjunction with accompanying drawings.

The motion sensing apparatus provided by the disclosure can be applied to the mobile terminal so as to realize the screen shaking function of the mobile terminal. Certainly, the motion sensing apparatus can also be applied to electric vehicles, game consoles and other electronics.

The motion sensing apparatus provided by the disclosure includes two main parts, i.e., the sensing module and the processing module. The sensing module includes at least two outputs, the processing module includes at least two signal ports, each signal port of the processing module is connected with one of the outputs of the sensing module respectively; and the sensing module outputs sensing signals from different outputs according to sensed different motions, and the processing module performs corresponding processes according to the sensing signals received from different signal ports.

In one embodiment, the sensing module includes a signal source end and a connector. The sensing signals are generated in the following way: when the sensing module senses different motions, the corresponding output communicates with the signal source end via the connector so that the output communicating with the signal source end outputs the sensing signals. The processing module performs corresponding processes according to the sensing signals received. The signal source end is a grounding end, and the sensing signals are negative pulse signals. It can be understood that the main function of the signal source end is to provide a signal source. The signal source can be selected arbitrarily, i.e., can be selected as a high level, a low level, as well as a zero level. In one embodiment of the disclosure, the selected signal source is a zero level, i.e., the selected signal source end is a grounding end, and correspondingly the generated sensing signals are negative pulse signals.

In one embodiment, one end of the connector of the motion sensing apparatus is fixedly connected with the signal source end, while the other end of the connector is in contact with one output of the sensing module under different motions sensed by the sensing module correspondingly so as to make the output in communication with the signal source end. Certainly, the other end of the connector is in contact with different outputs of the sensing module in many ways, for example, in one embodiment of the disclosure, the connector includes a rotation axis, the other end of the connector is rotatable around the rotation axis so as to rotatably contact one output of the sensing module under the different motions sensed by the sensing module, thereby making the output of the sensing module in communication with the signal source end. Certainly, in one embodiment, in order to connect the connector with the output of the sensing module better, the connector is generally provided with a location unit, the main function of which is to fix the connector.

In one embodiment, the connector of the motion sensing apparatus includes a location unit, a reset unit, and a communication unit. The communication unit is connected with the location unit through the reset unit; the communication unit is shifted from an original position relative to the location unit to be in contact with one output of the sensing module and the signal source end under the different motions sensed by the sensing module to make the output of the sensing module in communication with the signal source end. The reset unit is mainly configured to restore the deviated communication unit to the original position. The communication unit can be a conductive metal, or other components with conductive function can also be selected. The reset unit can be a spring, or other spring devices with reset function can also be selected. The location unit can be a sensing cavity, or other location devices with location function can also be selected. For example, in one embodiment, the location unit is a sensing cavity including a buffer wall, the connector includes two of the communication units, the two of the communication units are located on both sides of the buffer wall respectively and connected to the buffer wall via the reset unit. The main reason that a buffer wall is arranged in the sensing cavity is that the buffer wall is configured to absorb the impact force of the conductive metal to restore the conductive metal to the original state rapidly.

The application of motion sensing apparatus on the mobile terminal is taken as an example below for illustration.

As shown in FIG. 1, which is a schematic diagram illustrating the application of motion sensing apparatus on the mobile terminal in a first embodiment of the disclosure, preferably, the mobile terminal refers to a mobile phone here. The connector is in contact with each different output of the sensing module rotatably when the sensing module senses different actions.

In the embodiment as shown in FIG. 1, the sensing cavity 1 becomes the location unit of the connector; and the conductive metal sheet 2 internally attached to the side wall of sensing cavity 1 communicates with the ground 9 via a lead 3, thereby forming the signal source end of the sensing module. The conductive metal sheet 5 internally attached to the side wall of sensing cavity 1 is connected with the processor via a signal line 6, and the conductive metal sheet 5 forms one output of the sensing module; the conductive metal sheet 8 internally attached to the side wall of sensing cavity 1 is connected with the processor via a signal line 7, and thus, the conductive metal sheet 8 forms the other output of the sensing module. Correspondingly, the processor becomes a processing module of the sensing apparatus. One end of the metal connecting rod 4 within the sensing cavity 1 is connected with the conductive metal sheet 5 while the other end is connected with the conductive metal sheet 2 via a rotation axis 10, i.e., the metal connecting rod 4 and the rotation axis 10 form the connector of the sensing module.

The motion sensing apparatus shown in FIG. 1 has two outputs. It can be understood that the motion sensing apparatus may have more than two outputs, which can be set as required during the production of the mobile terminal. The more number of the outputs there are, the more screen shaking functions of the mobile terminal can be realized. At the same time, the position of the conductive metal sheet can also be selected, i.e., it may not necessarily be located on the side wall of sensing cavity, it may be OK as long as the other end of the metal connecting rod 4 (refers to one end not connected with the rotation axis) can be in contact with the conductive metal sheet.

When the conductive metal sheet is located on the side wall of the sensing apparatus, and the user shakes the mobile terminal up and down or turns the mobile terminal upside down, the motion sensing apparatus within the mobile terminal performs the following operations:

When the user turns the mobile terminal upside down, the metal connecting rod 4, due to its own gravity, will disconnect from the conductive metal sheet 5 with the help of the rotation axis 10, and is in turn brought into contact with the conductive metal sheet 8. Since the conductive metal sheet 2 is connected to the ground 9 via the signal line 3, the conductive metal sheet 8 conducts with the conductive metal sheet 2 at this time, the conductive metal sheet 8 is also connected to the ground, the signal line 7 connected with the conductive metal sheet 8 will output a ground signal to the external processor, so that a corresponding detection pin of the processor generates a negative jump pulse output signal, and then the corresponding detection pin of the processor detects the negative pulse signal and generates a corresponding interrupt signal, thereby performing corresponding screen shaking process.

When the user turns the mobile terminal upside down again, the metal connecting rod 4, due to its own gravity, will disconnect from the conductive metal sheet 8 with the help of the rotation axis 10, and is brought into contact with the conductive metal sheet 5 again, and therefore the conductive metal sheet 5 conducts with the conductive metal sheet 2, the signal line 6 connected with the conductive metal sheet 5 outputs a ground signal to the external processor, so that a corresponding detection pin of the processor generates a negative jump pulse output signal, and then the corresponding detection pin of the processor detects the output signal and generates a corresponding interrupt signal, thereby performing corresponding screen shaking process.

It can be seen that, if the user shakes the mobile terminal up and down alternately or turns the mobile terminal upside down alternately, the metal connecting rod 4 is brought into contact with the conductive metal sheet 8 and the conductive metal sheet 5 respectively so that the signal line 7 and the signal line 6 respectively output the ground signals to the corresponding detection pins of the external processor in a short time. In one embodiment, the user may shake the mobile terminal up and down when the user wants to adjust the volume, the signal line 7 and the signal line 6 respectively output the ground signals to the external processor in a short time. Since the processor receives two shaking signals output by the signal line 7 and the signal line 6 in a short time, the processor may only process the signal output by the signal line 7, and ignore the signal output by the signal line 6 or only processes the signal output by the signal line 6, and ignores the signal output by the signal line 7. Thus, the processor correspondingly detects the pin and generates an interrupt signal according to the signal output by the signal line 6 or signal line 7, invokes a corresponding application subprogram according to the interrupt signal, performs corresponding screen shaking process, thereby achieving the goal of adjusting the volume.

From the above, the motion sensing apparatus can sense the shaking made by user on the mobile terminal in the direction of gravity very well. Certainly, the apparatus can also sense the shaking motion made by user on the mobile terminal in other directions by appropriately adjusting the position of the conductive metal sheets 5 and 8.

Figure 2:
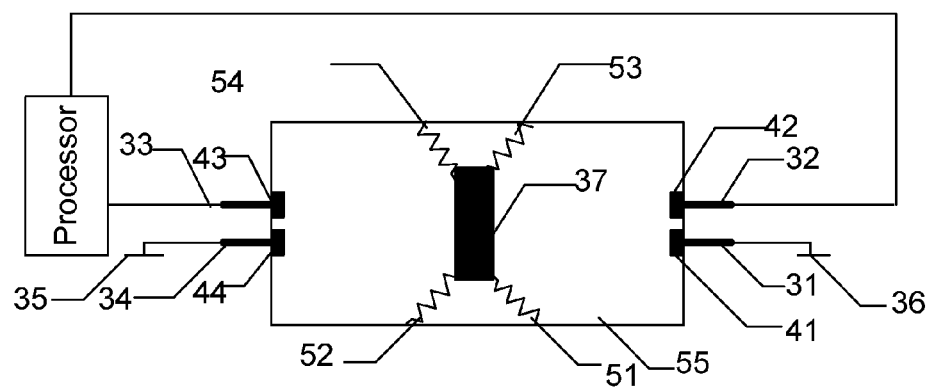
FIG. 2 is a schematic diagram of a second embodiment of a motion sensing apparatus of the disclosure.

As shown in FIG. 2, which is a schematic diagram illustrating the application of motion sensing apparatus to the mobile terminal in a second embodiment of the disclosure, the connector of the motion sensing apparatus includes a location unit, a reset unit and a communication unit. The communication unit is connected with the location unit via the reset unit, and the communication unit is shifted from an original position relative to the location unit to be in contact with one output of the sensing module and the signal source end under the different motions sensed by the sensing module, and makes the output in communication with the signal source end, and the reset unit is configured to restore the shifted communication unit to the original position. In practical use, the location unit can be a sensing cavity, and the reset unit can be a spring.

Specifically, the conductive metal sheet 43 becomes one output of the sensing module when the conductive metal sheet 43 is connected with the processing module through a signal line 33, and the conductive metal sheet 42 becomes the other output of the sensing module when the conductive metal sheet 42 is connected with the processor via a signal line 32. The conductive metal sheet 44 is connected to the ground 35 via a signal line 34 to form one signal source end of the sensing module. The conductive metal sheet 41 is connected to the ground 36 via a signal line 31 to form the other signal source end of the sensing module. It should be noted that these two signal source ends are actually equivalent to one signal source end within the mobile terminal. The sensing cavity 55 is used as the location unit of the connector, and the springs 51, 52, 53 and 54 are used as the reset unit of the connector. The conductive metal 37 is used as the communication unit of the connector. One end of each of the springs 51, 52, 53 and 54 is connected with the sensing cavity 55 correspondingly, and the other end is connected with the conductive metal 37. When the user shakes the mobile terminal left, the conductive metal 37 will shake left, and at the same time is brought into contact with the conductive metal sheet 43 and the conductive metal sheet 44, so that the corresponding signal source end communicates with the output of the sensing module, and then outputs a negative pulse signal at the output, thereby making the corresponding detection pin of the processor generate an interrupt signal, and thus performing corresponding process according to the interrupt signal. Similarly, when the conductive metal 37 shakes right, it will also make the corresponding detection pin of the processor generate an interrupt signal, and corresponding process is performed according to the interrupt signal, thereby realizing the screen shaking function of the mobile terminal.

Correspondingly, the position of conductive metal sheets forming the signal source end and the output in the embodiment shown in FIG. 2, can also be changed. If the conductive metal sheets are located on the top wall and bottom wall of the sensing cavity, when the user shakes the mobile terminal up and down, and similarly, the conductive metal communicates with the conductive metal sheets, so that the corresponding detection pin of the processor generates the interrupt signal, and further it can also perform corresponding processes on the mobile terminal with other functions.

Certainly, it can be understood that the conductive metal and the spring shown in FIG. 2 are connected so that the conductive metal is connectable with the conductive metal sheet at any position within the sensing cavity. If the apparatus only senses the motion in the direction of gravity, it is possible to change the way in which the spring is connected with the conductive metal, and it is possible to connect two springs with the conductive metal. One end of each of the two springs is connected with the top wall and the bottom wall of the sensing cavity respectively while the other end is connected with the conductive metal. Similarly, sensing the motion in the horizontal direction only can also be realized in a connecting manner of the spring and the conductive metal through changing the apparatus.

Figure 3:
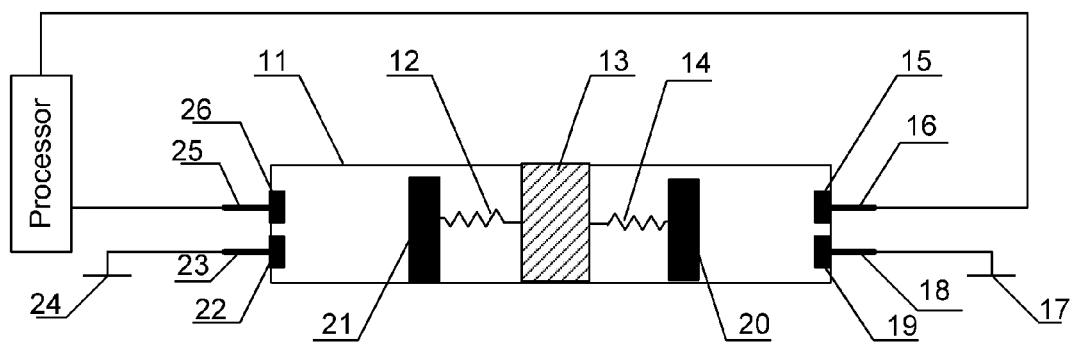
FIG. 3 is a schematic diagram of a third embodiment of a motion sensing apparatus of the disclosure.

As shown in FIG. 3, it is a schematic diagram illustrating the application of motion sensing apparatus to the mobile terminal in a third embodiment of the disclosure. The location unit of the motion sensing apparatus is a sensing cavity 11 including a buffer wall 13. The buffer wall 13 can absorb the impact force of the conductive metal. The connector includes two of the communication units. The two of the communication units are located on both sides of the buffer wall 13 respectively and connected to the buffer wall via the reset unit, and the reset unit is a spring.

In FIG. 3, the two communication units are specifically conductive metals 20 and 21, the reset unit is specifically springs 12 and 14. The two conductive metals 20 and 21 are located on both sides of the buffer wall 13 respectively and connected to the buffer wall 13 via the springs 12 and 14. The conductive metal sheet 22 of the conductive metal sheets 15, 19, 22, 26 internally attached to the side wall of sensing cavity 11 is connected with the grounding end 24 through the signal line 23, thereby forming one signal source end. The conductive metal sheet 19 is connected with the grounding end 17 via the signal line 18, thereby forming the other signal source end. It should be noted that these two signal source ends are actually equivalent to one signal source end within the mobile terminal, which are drawn out in FIG. 3 for clarity. If the conductive metal sheet 15 is connected with the external processor via the signal line 16, the conductive metal sheet 15 then becomes one output of the sensing module, and if the conductive metal sheet 26 is connected with the external processor via the signal line 25, the conductive metal sheet 26 then becomes the other output of the sensing module.

Similarly, the apparatus shown in FIG. 3 may have more than two outputs, which can be set as required during the production of the mobile terminal. The more the number of the outputs there are, the more screen shaking functions of the mobile terminal can be realized. At the same time, the position of the conductive metal sheet can also be selected, i.e., it may not necessarily be located on the side wall of sensing cavity, as long as one conductive metal can be brought into contact with another conductive metal to connect the output of the sensing module with the signal source end.

When the mobile terminal is shaken left and right, the motion sensing apparatus shown in FIG. 3 performs the following operations:

When the user shakes the mobile terminal left, the conductive metal 21 moves left, and is finally in contact with the conductive metal sheets 26 and 22 to make the conductive metal sheet 26 in communication with the conductive metal sheet 22. Since the conductive metal sheet 22 is connected to the grounding end via the signal line 23 and outputs a ground signal, the conductive metal sheet 26 also outputs the ground signal, and therefore the signal line 25 connected with the conductive metal sheet 26 also outputs the ground signal to the external processor, causing the corresponding detection pin of the processor to generate a negative jump pulse signal, and thus generating an interrupt signal accordingly. Meanwhile, the conductive metal 21 moves right due to the effect of the spring 12, and is finally in contact with the buffer wall 13, since the buffer wall 13 is a flexible buffer material, the buffer wall can absorb the impact force caused when the conductive metal 21 moves right to achieve the goal of slowing down the speed at which the conductive metal 21 moves right, which finally restores the conductive metal 21 to the original state, and then continues the next left shaking motion.

When the user shakes the mobile terminal right, the conductive metal 20 moves right, and is finally in contact with the conductive metal sheets 15 and 19 to make the conductive metal sheet 15 in communication with the conductive metal sheet 19. Since the conductive metal sheet 19 is connected to the grounding end via the signal line 18 and outputs a ground signal, the conductive metal sheet 15 also outputs the ground signal, and therefore the signal line 16 outputs the ground signal to the external processor, causing the corresponding detection pin of the processor to generate a negative jump pulse signal, and thus generating an interrupt signal accordingly. Meanwhile, the conductive metal 20 moves right due to the effect of the spring 14, and is finally in contact with the buffer wall 13, since the buffer wall 13 is a flexible buffer material, the buffer wall can absorb the impact force caused when the conductive metal 20 moves left to slow down the speed at which the conductive metal 20 moves left, which finally restores the conductive metal 20 to the original state, and then continues the next right shaking motion.

The processor receives an output signal from the sensing module, and the corresponding detection pin of the processor generates a corresponding interrupt signal according to the output signal. The processor determines the source of the interrupt signal and invokes the corresponding application subprogram to perform the corresponding screen shaking process, thereby achieving the screen shaking function of the mobile terminal.

Certainly, the apparatus shown in FIG. 3 can also sense the shaking motion made by user on the mobile terminal in other directions by appropriately adjusting the position of the conductive metal sheets in FIG. 3.

It should be noted that, the motion sensing apparatus shown in FIG. 1 and FIG. 3 can be applied to the mobile terminal simultaneously during the production of the mobile terminal. The motion sensing apparatus shown in FIG. 1 is mainly configured to sense the fact that the user shakes the mobile terminal up and down or turns the mobile terminal upside down, and the motion sensing apparatus shown in FIG. 3 is mainly configured to sense when the user shakes the mobile terminal left and right. The two motion sensing apparatus do not interfere with each other.

Figure 4:
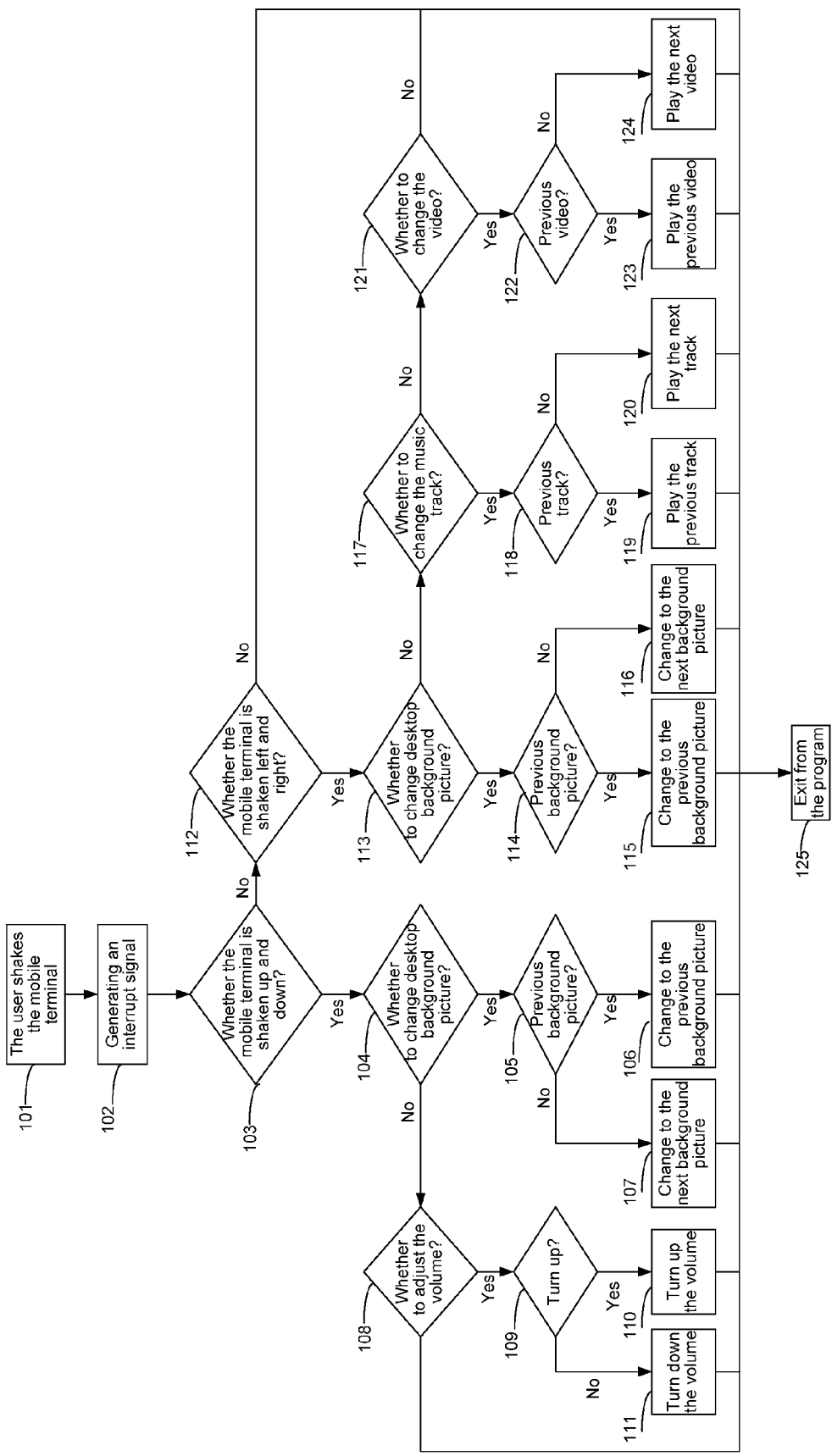
FIG. 4 is a flowchart of a method for realizing the screen shaking of a mobile terminal in one embodiment of the disclosure.

As shown in FIG. 4, which is a flowchart of a method for realizing screen shaking of a mobile terminal of the disclosure, the method specifically includes the following steps:

101: the user shakes the mobile terminal so that the sensing module arranged within the mobile terminal senses the shaking motion of the user, thereby allowing the sensing module to generate a negative jump pulse output signal;

102: the corresponding pin of the processing module (which may be a processor) receives the negative jump pulse output signal and generates a corresponding interrupt signal;

103: the processing module determines the shaking manner of the mobile terminal (mainly shaking up and down and shaking left and right) according to the source of generated interrupt signal, if the interrupt signal is generated by shaking the mobile terminal up and down, turning to 104, otherwise, turning to 112;

104: if it has been determined that the mobile terminal is shaken up and down, then determining the specific screen shaking application, i.e. determining whether a background picture needs to be changed or a volume needs to be adjusted, if the background picture needs to be changed, then turn to 105, otherwise, turn to 108;

105: if it has been determined that the background picture is to be changed, then a specific adjusting mode is to be determined, i.e., to determine whether to invoke a previous background picture as the current background picture, if so, turn to 106, otherwise, turn to 107, and a next background picture will be used as the current background picture;

106: if it has been determined that the previous background picture is to be used as the current background picture, then the processing module invokes a subprogram to change to the previous background picture and exits from the program;

107: if it has been determined that the next background picture is to be used as the current background picture, the processing module invokes a subprogram to change to the next background picture and exits from the program;

108: determining whether to adjust the volume, if so, turn to 109, otherwise, exit the program;

109: if it has been determined that the volume is to be adjusted, then the specific adjusting mode is to be determined, i.e. to determine whether to turn up the volume, if so, turn to 110, otherwise, turn to 111, and the volume is determined to be turned down;

110: if it has been determined that the volume is to be turned up, then the processing module invokes a subprogram to turn up the current volume of the mobile terminal and exits from the program;

111: if it has been determined that the volume is to be turned down, then the processing module invokes a subprogram to turn down the current volume of the mobile terminal and exits from the program;

112: determining whether the mobile terminal is shaken left and right, if so, turn to 113, otherwise, exit from the program;

113: if it has been determined that the mobile terminal is shaken left and right, then a specific screen shaking application is determined, i.e., to determine whether the user needs to change the desktop background picture, if so, turn to 114; otherwise, turn to 117;

114: if it has been determined that the desktop background picture needs to be changed, then a specific adjusting mode is to be determined, i.e. to determine whether to change to the previous background picture; if so, turn to 115, otherwise, turn to 116, and the next background picture will be used as the current background picture;

115: if it has been determined that the previous background picture will be used as the current background picture, then the processing module invokes a subprogram to change to the previous background picture and exits from the program;

116: if it has been determined that the next background picture will be used as the current background picture, then the processing module invokes a subprogram to change to the next background picture and exits from the program;

117: determining whether the purpose that the user shakes the mobile terminal left and right is to change a music track, if so, turn to 118, otherwise, turn to 121;

118: if it has been determined that the music track needs to be changed, then a specific adjusting mode is to be determined, i.e. to determine whether to change to a previous track, if so, turn to 119, otherwise, turn to 120, and change to a next track;

119: if it has been determined that the music track will be changed to the previous track, then the processing module invokes a subprogram to play the previous track and exits from the program;

120: if it has been determined that the music track will be changed to the next music track, then the processing module invokes a subprogram to play the next track and exits from the program;

121: determining whether the purpose that the user shakes the mobile terminal left and right is to change the current video, if so, turn to 122, otherwise, directly exit from the program;

122: if it has been determined that the current video needs to be changed, then a specific adjusting mode is to be determined, i.e. to determine whether to change to a previous video file, if so, turn to 123; otherwise, turn to 124, and change to a next video file;

123: if it has been determined that the current video needs to be changed to the previous video file, then the processing module invokes a subprogram to play the previous video file and exits from the program;

124: if it has been determined that the current video needs to be changed to the next video file, then the processing module invokes a subprogram to play the next video file and exits from the program.

It should be noted that, in the step of realizing the screen shaking of the mobile terminal described above, the user can perform screen shaking application such as changing the desktop background, adjusting the volume, changing the music track, and changing the video by shaking the mobile terminal. Certainly, by shaking the mobile terminal, the user also can make other functions of the mobile terminal have screen shaking characteristics, such as changing the current short message displayed, the current displayed photo, or the like. That is to say, when the user shakes the mobile terminal, the sensing module will generate a pulse signal, as long as the sensing signal generated by the sensing module can generate an interrupt signal on the corresponding detection pin of the processing module, and a corresponding application subprogram is preset for the interrupt signal, the application subprogram can then be used, to perform corresponding processes on corresponding screen shaking application. But, due to the limited dimension specification of mobile terminal hardware, several screen shaking applications commonly used by the user in daily life are usually pre-selected as subprograms, and the corresponding screen shaking application is processed through shaking the mobile terminal.

It should be understood that, in preset application subprogram, the processes of the screen shaking application can be set as required, that is, processing rules described in the embodiment should not be used as the only processing mode of a method for implementing the whole mobile terminal with screen shaking function.

It should be noted that, when the application subprogram processes a specific adjusting mode of screen shaking application, it should be determined firstly whether the mobile terminal is in an application state of the application currently, if the mobile terminal is in the application state of the screen shaking application currently, the application subprogram performs the corresponding screen shaking process. If the mobile terminal is not in the application state of the screen shaking application, the application subprogram does not respond. For example, if the current mobile terminal is in the application state of playing music tracks, but the processing module generates an interrupt signal by which the previous video is to be played, the application subprogram does not adjust the playing of the previous video.

Additionally, in actuality, the mobile terminal is sometimes shaken, but it is not intended to change the pictures or videos etc. In order to avoid such accidental operations, a determination program for determining whether the shaking is an accidental operation can be set in the application subprogram.

By using the motion sensing apparatus of the disclosure, a hardware circuit is simplified to some extent, the cost is saved, and the consumption of electric energy is reduced. The motion sensing apparatus may be applied to the mobile terminal to produce a mobile terminal with screen shaking function, which selects the sensing module and the processing module to realize the screen shaking function of the mobile terminal rather than a sensor system consisting of a gravity sensor and/or an acceleration sensor and a complex hardware processing circuit in the mobile terminal with screen shaking function. In such a way, the existing sensor system is replaced with some simple components, which not only simplifies the hardware circuit of the mobile terminal, reduces the production cost of the mobile terminal, but also improves the endurance capability and the reliability of the mobile terminal to some extent.

The above is the further detailed description made to the disclosure in conjunction with specific embodiments, but it should not be considered that the specific embodiments of the disclosure are only limited to these descriptions. For one of ordinary skill in the art to which the disclosure belongs, many deductions and replacements can be made without departing from the inventive concept. Such deductions and replacements should fall within the scope of protection of the disclosure.

What is claimed is:

1. A motion sensing apparatus, comprising: a sensing module and a processing module, wherein the sensing module comprises at least two outputs, the processing module comprises at least two signal ports, each signal port of the processing module is connected with one of the outputs of the sensing module respectively; and the sensing module outputs sensing signals from different outputs according to sensed different motions, and the processing module performs corresponding processes according to the sensing signals received from different signal ports;

wherein the sensing module comprises a connector, the connector comprises a location unit, a reset unit and two communication units; wherein the location unit is a sensing cavity comprising a buffer wall, the two communication units are located on both sides of the buffer wall respectively and connected to the buffer wall via the reset unit, and the reset unit is a spring.

2. The sensing apparatus according to claim 1, wherein the sensing module further comprises a signal source end, the generation of the sensing signals comprises: when the sensing module senses the different motions, the corresponding output communicates with the signal source end via the connector so that the output communicating with the signal source end outputs the sensing signals.

3. The sensing apparatus according to claim 2, wherein the signal source end is a grounding end, and the sensing signals are negative pulse signals.

4. The sensing apparatus according to claim 3, wherein the communication unit is shifted from an original position relative to the location unit to be in contact with one output of the sensing module and the signal source end under the different motions sensed by the sensing module, and makes the output in communication with the signal source end, and the reset unit is configured to restore the shifted communication unit to the original position.

5. The sensing apparatus according to claim 4, wherein the communication unit is a conductive metal.

6. A mobile terminal, comprising the motion sensing apparatus according to claim 5.

7. A mobile terminal, comprising the motion sensing apparatus according to claim 4.

8. A mobile terminal, comprising the motion sensing apparatus according to claim 3.

9. The sensing apparatus according to claim 2, wherein the communication unit is shifted from an original position relative to the location unit to be in contact with one output of the sensing module and the signal source end under the different motions sensed by the sensing module, and makes the output in communication with the signal source end, and the reset unit is configured to restore the shifted communication unit to the original position.

10. The sensing apparatus according to claim 9, wherein the communication unit is a conductive metal.

11. A mobile terminal, comprising the motion sensing apparatus according to claim 10.

12. A mobile terminal, comprising the motion sensing apparatus according to claim 9.

13. A mobile terminal, comprising the motion sensing apparatus according to claim 2.

14. A mobile terminal, comprising the motion sensing apparatus according to claim 1.

* * * * *